US012740545B2

(12) United States Patent
Wu et al.

(10) Patent No.: US 12,740,545 B2
(45) Date of Patent: Sep. 22, 2026

(54) ANIMAL FEEDING APPARATUS AND METHOD USING SAME

(71) Applicant: JINHUA JIU MIAO ENTERPRISE MANAGEMENT CO., LTD., Jinhua (CN)

(72) Inventors: Xia Wu, Jinhua (CN); Yun Xu, Jinhua (CN); Yifan Ge, Jinhua (CN)

(73) Assignee: JINHUA JIU MIAO ENTERPRISE MANAGEMENT CO., LTD., Jinhua (CN)

(*) Notice: Subject to any disclaimer, the term of this patent is extended or adjusted under 35 U.S.C. 154(b) by 925 days.

(21) Appl. No.: 18/147,728

(22) Filed: Dec. 29, 2022

(65) Prior Publication Data

US 2023/0263133 A1 Aug. 24, 2023

(30) Foreign Application Priority Data

Feb. 23, 2022 (CN) ......................... 202220367981.3

(51) Int. Cl.
*A01K 5/02* (2006.01)
*A61D 7/00* (2006.01)

(52) U.S. Cl.
CPC .............. *A01K 5/0275* (2013.01); *A61D 7/00* (2013.01)

(58) Field of Classification Search
CPC ..... A01K 5/0275; A61D 7/00; A61M 5/1782; A61M 5/31566; A61M 2005/3114; B01L 3/0217
See application file for complete search history.

(56) References Cited

U.S. PATENT DOCUMENTS

| | | | | |
|---|---|---|---|---|
| 6,245,046 B1 * | 6/2001 | Sibbitt | A61M 5/31511 | 604/191 |
| 7,678,084 B2 * | 3/2010 | Judson | A61M 5/24 | 604/218 |
| 7,967,793 B2 * | 6/2011 | Sibbitt, Jr. | A61M 5/3148 | 604/191 |
| 11,305,060 B2 * | 4/2022 | Brandeis | A61M 1/774 | |
| 2013/0046272 A1 * | 2/2013 | Knight | A61J 9/001 | 604/411 |

* cited by examiner

*Primary Examiner* — Wesley G Harris
*Assistant Examiner* — Charles W Nichols
(74) *Attorney, Agent, or Firm* — JEEN IP LAW, LLC

(57) ABSTRACT

An animal feeding apparatus is related, including a base and a reservoir connected to the base, the medium in the reservoir is driven into or out of the reservoir through a port of the reservoir. The base includes a first cavity communicating with the reservoir, and a second cavity adjacent to and communicating with the first cavity. A piston is movable positioned in the first cavity, and having a first force end away from the reservoir. An activator is movable positioned in the second cavity, and having a second force end away from the reservoir. An linkage member is formed between the first cavity and the second cavity, and engages with the piston and the activator and guide the piston and the activator to move in two opposite directions to get the medium to move into or out of the reservoir. An animal feeding method is also related.

9 Claims, 5 Drawing Sheets

ANIMAL FEEDING APPARATUS AND METHOD USING SAME

TECHNICAL FIELD

The present disclosure relates to an animal feeding apparatus, especially to an animal feeding apparatus for single hand operation, and an animal feeding method using the animal feeding apparatus.

BACKGROUND

In recent years, raising a house pet is the new fashion. Many families raise pets and treat their pets like a member of the family. This means that people love their pets, and they would offer their pets with a home, food, exercise, and medical care.

When the pet gets sick, pet owners always need to feed the pet with some medicine, and a feeding apparatus is always needed to complete the feeding process. Feeding apparatus in the related arts usually involves a two-handed operation, which makes the feeding process more difficult, as some pets may struggle fiercely during the feeding process. Besides, currently ordinary medicine feeding apparatus or syringes require a certain amount of force to complete the pumping and discharging of liquid, which is time-consuming, and will also annoying the pets.

SUMMARY

In one aspect, one objective of the present disclosure is to provide such an animal feeding apparatus that the animal feeding apparatus, including a base and a reservoir connected to an end of the base, the reservoir configured to accommodating medium and comprising a port away from the base, wherein, the medium is driven into or out of the reservoir through the port; the base including a first cavity communicating with the reservoir, and a second cavity adjacent to and communicating with the first cavity. The animal feeding apparatus further includes a piston movable positioned in the first cavity, and having a first force end away from the reservoir and extending out of the first cavity; an activator movable positioned in the second cavity, and having a second force end away from the reservoir and extending out of the second cavity; and an linkage member formed between the first cavity and the second cavity, and configured to engage with the piston and the activator and guide the piston and the activator to move in two opposite directions. Herein, the first force end and second force end are configured to alternatively get pressed to drive the piston to get the medium to move out of the reservoir, or to drive the activator to get the medium to move into the reservoir from a medium supply source.

In another aspect, the linkage member includes a separator fixed inside the base and separate the first cavity to the second cavity, and a guiding gear rotatable positioned on the separator, wherein the guiding gear is rotatable around an axis perpendicular to moving directions of the piston and the activator.

In another aspect, the separator includes a through hole for receiving the guiding gear, with a shaft fixed in the through hole and movably connected with the guiding gear, the shaft extending parallel with the axis.

In another aspect, the piston includes a sealing member adjacent to the reservoir, and a pushrod connecting the first force end with the sealing member, the pushrod engaging with the guiding gear; the sealing member is sealed connected to the base.

In another aspect, the activator includes a link rod extending from the second force end into the second cavity, with the link rod engaging with the guiding gear.

In another aspect, the pushrod comprises a first toothed rack engaging with the guiding gear.

In another aspect, the link rod comprises a second toothed rack engaging with the guiding gear.

In another aspect, the animal feeding apparatus further includes a handle protruding on the base and away from the reservoir.

In another aspect, the handle is integrally formed with the base.

In another aspect, the medium is either in liquid or powder form.

In another aspect, the reservoir is detachably connected with the base.

In another aspect, the reservoir is in threaded connection with the base.

In another aspect, the animal feeding apparatus further includes a tube connecting to the port.

In another aspect, the reservoir is at least partially transparent to show the medium inside the reservoir.

In another aspect, the first cavity is co-axial with the reservoir, the second cavity is formed on a lateral side of the fist cavity and extending parallelly to the first cavity.

In another aspect, the pushrod is coaxial with the first cavity, and the link rod is parallel to the pushrod.

In a further aspect, the present disclosure further provides an animal feeding method using above mentioned the animal feeding apparatus, including steps of: holding animal feeding apparatus towards the medium supply source, and pressing the second force end to drive the activator to move towards the reservoir, further to guide the piston move away from the reservoir to get the medium in the medium supply source to move into the reservoir through the port; and relocating the animal feeding apparatus to an animal, and pressing the first force end to drive the piston to move towards the reservoir to get the medium to move out of the reservoir through the port to the animal.

Beneficial effects of the present invention are as follows.

According to the present disclosure, the feeding apparatus has a simple structure, and the feeding method by using the animal feeding apparatus can be completed through single hand operation, making the animal feeding process quicker and easier.

BRIEF DESCRIPTION OF DRAWINGS

In order to more clearly illustrate the technical solutions in the embodiments of the present disclosure, the following will briefly describe the accompanying drawings used in the description of the embodiments. Obviously, the accompanying drawings in the following description are only some embodiments of the present disclosure. For a person of ordinary skill in the art, other drawings may be obtained from these drawings without creative work.

DETAILED DESCRIPTION OF EMBODIMENTS

Figure 1:
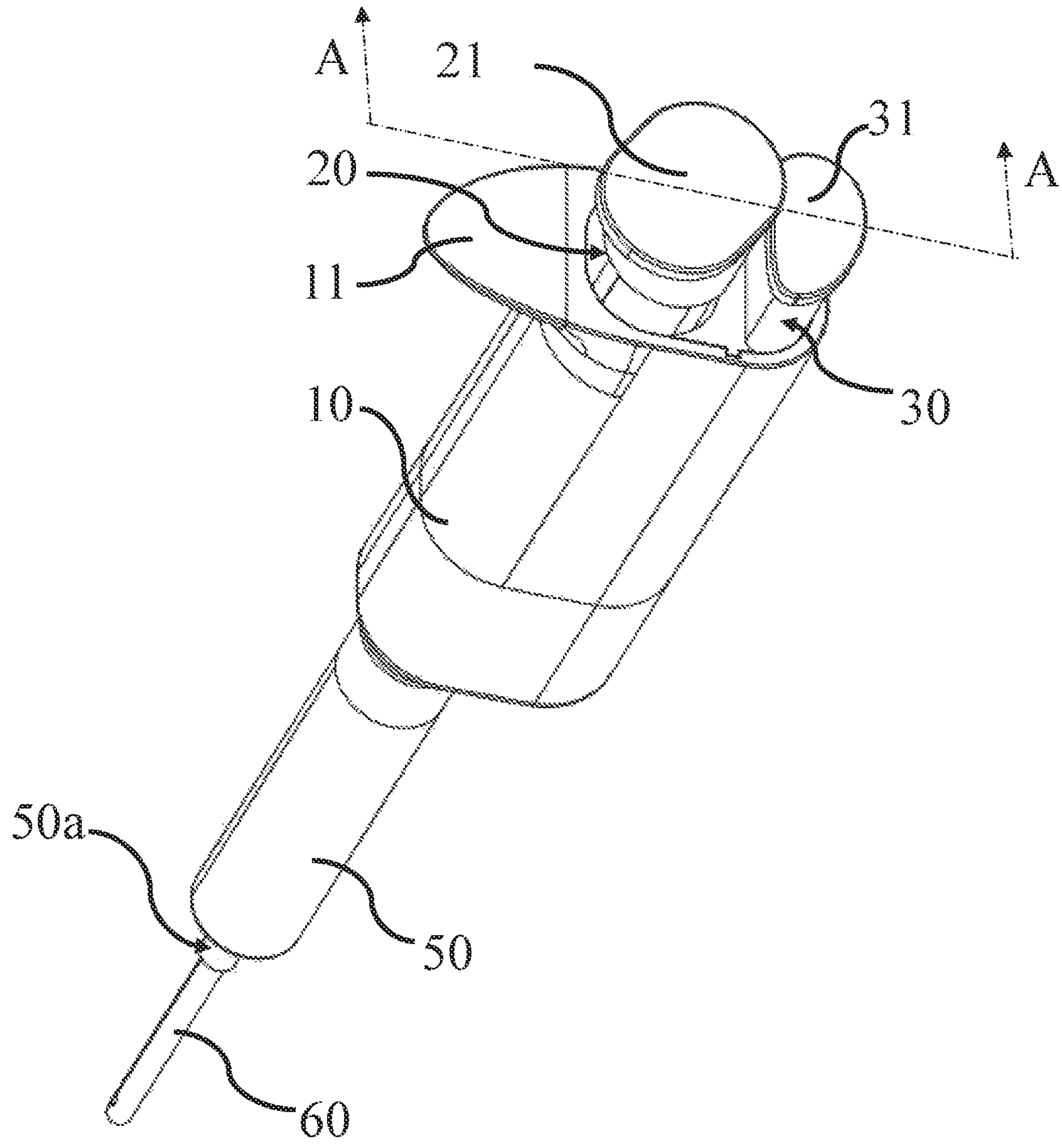
FIG. 1 is a schematic diagram of a general structure of an animal feeding apparatus according to an embodiment of the present disclosure.

To make the objectives, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Embodiments are described below.

As shown in FIGS. 1-5, an animal feeding apparatus according to embodiments of the present disclosure is provided.

The animal feeding apparatus is particular to be used to feed pets with medicine, and include a base 10 and a reservoir 50 connected to an end 10*e* of the base 10, the reservoir 50 configured to accommodating medium and including a port 50*a* away from the base 10. Herein, the medium maybe medicine either in liquid or powder form, and is able to be driven into or out of the reservoir 50 through the port 50*a*. The base 10 includes a first cavity 10*a* communicating with the reservoir 50, and a second cavity 10*b* adjacent to and communicating with the first cavity 10*a*. The animal feeding apparatus further includes a piston 20 movable positioned in the first cavity, and having a first force end 21 away from the reservoir and extending out of the first cavity 10*a*; an activator 30 movable positioned in the second cavity 10*b*, and having a second force end 31 away from the reservoir 50 and extending out of the second cavity 10*b*; and an linkage member 40 formed between the first cavity and the second cavity, and configured to engage with the piston 20 and the activator 30 and guide the piston 20 and the activator 30 to move in two opposite directions. Herein, the first force end 21 and second force end 31 are configured to alternatively get pressed to drive the piston 20 to get the medium in the reservoir 50 to move out of the reservoir 50 through the port 50*a*, or to drive the activator 30 to move towards the reservoir 50, so as to lead the piston moves in an opposite direction to get away from the reservoir, further to get the medium to move into the reservoir 50 from a medium supply source via the port 50*a*.

In a further specific embodiment, the linkage member 40 includes a separator 41 fixed inside the base 10 and separate the first cavity 10*a* to the second cavity 10*b*, and a guiding gear 42 rotatable positioned on the separator, wherein the guiding gear is rotatable around an axis 43' perpendicular to moving directions of the piston 20 and the activator 30.

Figure 3:
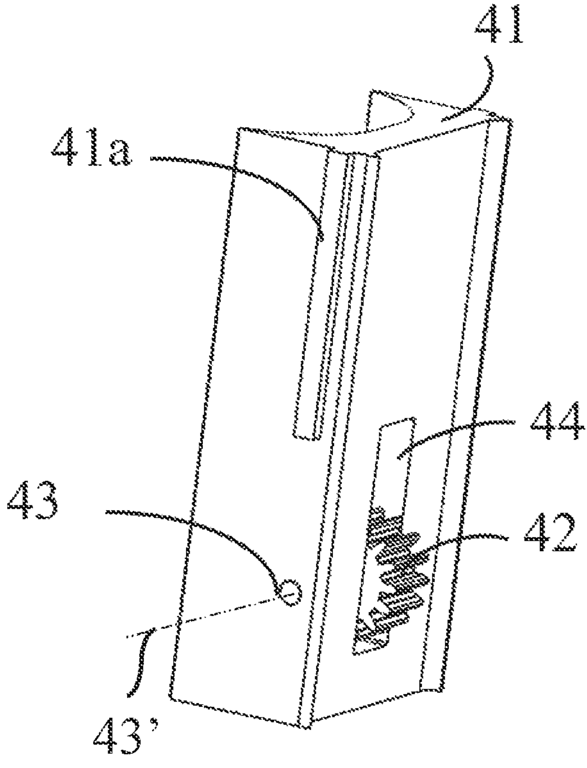
FIG. 3 is an enlarged view of an embodiment of a linkage member in FIG. 3.

As shown in FIG. 3, the separator 41 includes a through hole 44 for receiving the guiding gear 42, with a shaft 43 fixed in the through hole and movably connected with the guiding gear 42, the shaft 43 extending parallel with the axis 43'.

Figure 2:
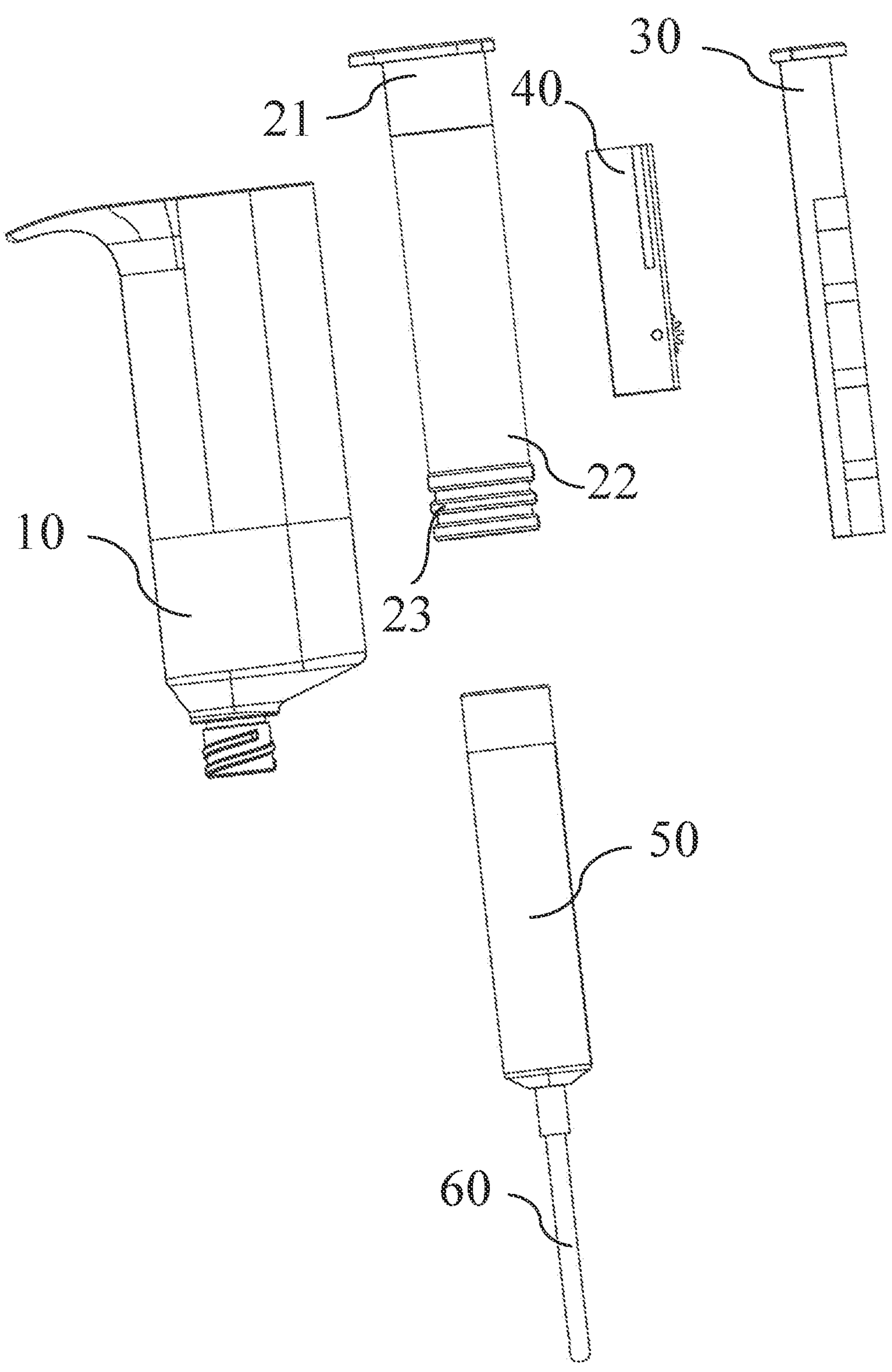
FIG. 2 is an exploded view of an embodiment of the animal feeding apparatus in FIG. 1.
Figure 5:
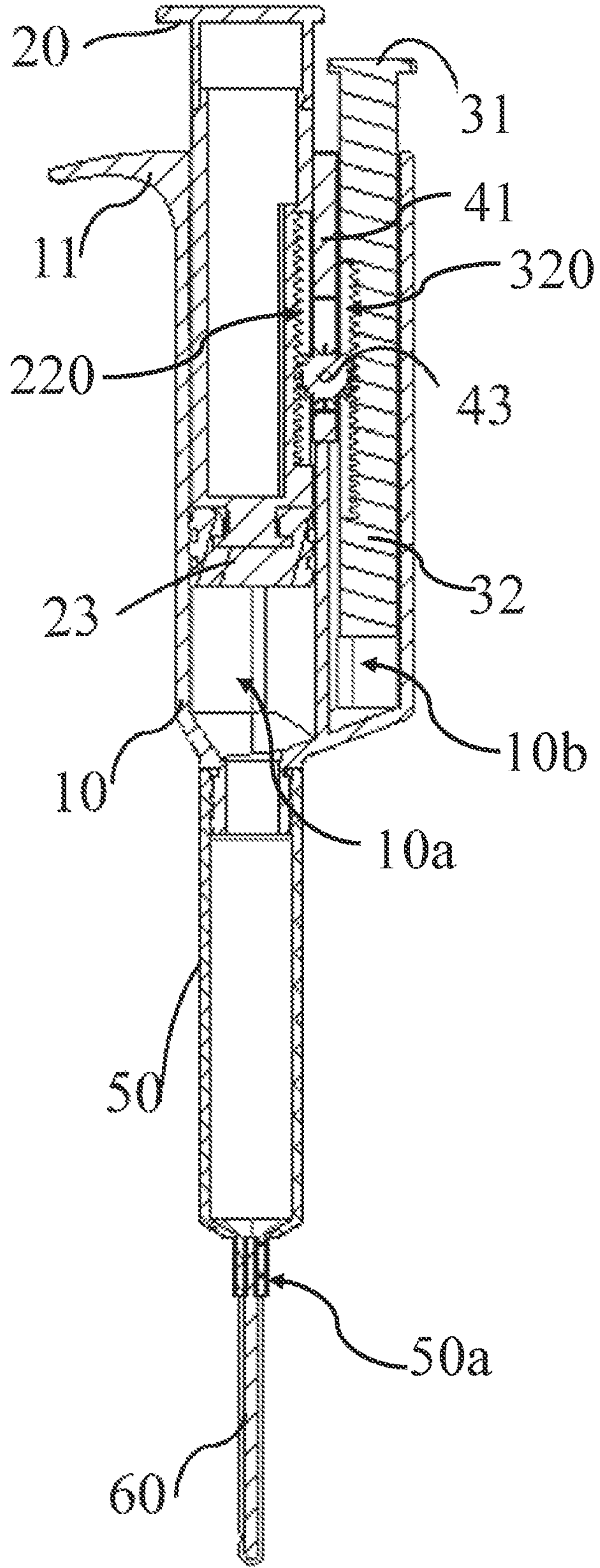
FIG. 5 is a section view of the animal feeding apparatus along A-A line in FIG. 1.

As shown in FIG. 2 as well as FIG. 5, the piston 20 includes a sealing member 23 adjacent to the reservoir 50, and a pushrod 22 connecting the first force end 21 with the sealing member 23, the pushrod 22 engaging with the guiding gear 42; the sealing member 23 is sealingly connected to the base 10.

As shown in FIG. 5, in the activator 30 further includes a link rod 32 extending from the second force end 31 into the second cavity 10*b*, with the link rod 32 engaging with the guiding gear 42.

As shown in FIG. 5, the pushrod 22 includes a first toothed rack 220 engaging with the guiding gear 42, while the link rod 32 includes a second toothed rack 320 engaging with the guiding gear 42.

Further, to facilitate the holding stability of the animal feeding apparatus during the feeding procedure, the animal feeding apparatus further includes a handle 11 protruding on the base 10 at the end away from the reservoir 50. The handle 11 is integrally formed with the base 10.

As shown in FIG. 2 and FIG. 5, the reservoir 50 is detachably connected with the base 10. More specifically, as shown in FIG. 4, the reservoir can be in threaded connection with the base through a thread 12 formed at the end 10*e*.

As shown in FIG. 5, the animal feeding apparatus further includes a tube 60 connecting to the port 50*a*. When extracting the medium in the medium supply source, for example a medicine bottle, the tube 60 may be inserted deeply in to the medicine bottle, and people may press the second force end 31 to drive the activator 30 to move towards the reservoir 50, so as to lead the piston 20 moves in an opposite direction to get away from the reservoir 50, and thus the medicine can be extracted from the medicine bottle to the reservoir via the tube 50 and the port 50*a*. However, when feeding the medicine in the reservoir 50 to an animal, for example a cat, the tube 60 can be inserted into the cat' mouth, and people can press the first force end 21 to drive the piston 20 to move towards the reservoir, to get the medium in the reservoir 50 to move out of the reservoir 50 through the port 50*a* and the tube 60 to the cat. The tube 60 is softer than the port 50*a*, and may on one hand help to deduce the discomfort of the pets, and on the other hand facilitate the extracting of medium from the medium supply source.

Figure 4:
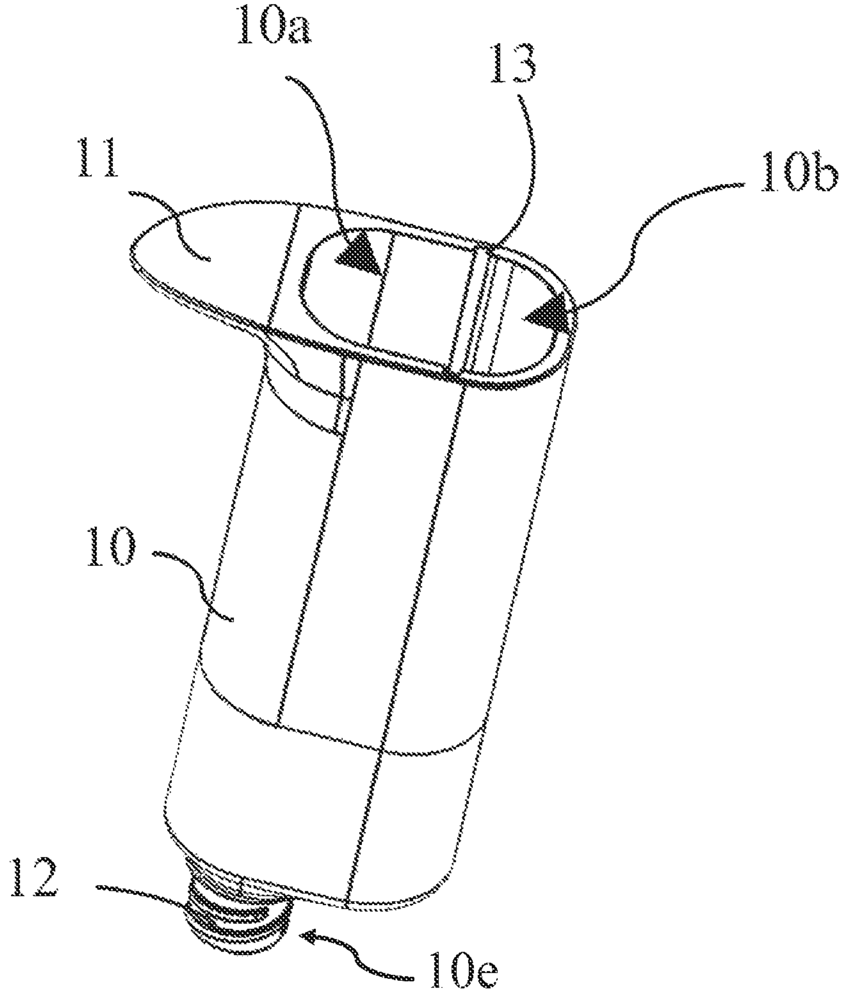
FIG. 4 is an enlarged view of an embodiment of a base in FIG. 3.

As shown in FIGS. 3-5, the base 10 includes a bottom wall connecting to the end 10*e*, a circular sidewall extending from the bottom wall in a direction away from the end 10*e*, and separating wall extending form the bottom wall to abut against the separator 41. The sealing member 23 is sealed with both the separating wall and inner surfaces of the circular sidewall. A projection 41*a* is formed on the separator 41 to fit with a slot 13 on the circular sidewall.

In a further embodiment, the reservoir 50 is at least partially transparent to show the medium inside the reservoir 50. The reservoir 50 may be made of transparent silicone.

As shown in FIG. 5 the first cavity 10*a* is co-axial with the reservoir 50, the second cavity 10*b* is formed on a lateral side of the fist cavity 10*a* and extending parallelly to the first cavity 10*a*. Moreover, the pushrod 22 is coaxial with the first cavity 10*a*, and the link rod 32 is parallel to the pushrod 22.

In a further embodiment, the present disclosure further provides an animal feeding method using the above mentioned the animal feeding apparatus. The method includes steps of: holding the animal feeding apparatus towards the medium supply source, and pressing the second force end 31 to drive the activator 30 to move towards the reservoir 50, further to guide the piston 20 move away from the reservoir 50 via the linkage member 40, to extract the medium in the medium supply source to the reservoir 50 through the port; and relocating the animal feeding apparatus to an animal for example a cat or dog, and pressing the first force end 31 to drive the piston 30 to move towards the reservoir 50 to get the medium to move out of the reservoir 50 through the port 50*a* to the animal. The aforementioned steps can be completed by only one hand, and the other hand of the people can help to grasp the cat or dog more firmly during the feeding procedure. Moreover, it can also be realized by one hand operation of the animal feeding apparatus, to feed different medicine to the pet during the feeding procedure, for example, after feeding first medicine to the pet, with one hand grasping the pet, the other hand may still hold the animal feeding apparatus and extract a second medicine from another medium supply source, and then feed the second medicine to the pet. Therefore, the feeding method using the animal feeding apparatus od the present disclosure, is less time-consuming than the feeding apparatus involving a two-handed operation in related arts.

In the description of the present disclosure, it should be understood that, terms such as "first" and "second" are used herein for purposes of description and are not intended to indicate or imply relative importance or significance or to imply the number of indicated technical features. Thus, the feature defined with "first" and "second" may comprise one or more of the features. In the description of the present disclosure, the term "a plurality of" means two or more than two, unless specified otherwise.

In the present disclosure, unless specified or limited otherwise, the terms "mounted", "connected", "coupled", "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on", "above", or "on top of" a second feature may include an embodiment in which the first feature is right or obliquely "on", "above", or "on top of" the second feature, or just means that the first feature is at a height higher than that of the second feature; while a first feature "below", "under", or "on bottom of" a second feature may include an embodiment in which the first feature is right or obliquely "below", "under" or "on bottom of" the second feature, or just means that the first feature is at a height lower than that of the second feature.

In the description of the present specification, the terms "an embodiment", "some embodiments", "an example", "a specific example", "some examples" or the like mean that a particular feature, structure, material, or characteristic described in connection with the embodiment or example is included in at least one embodiment or example of the present disclosure. In the specification, the appearances of the above-mentioned terms are not necessarily referring to the same embodiment or example. Furthermore, the particular features, structures, materials, or characteristics described can be combined in any suitable manner in one or more embodiments or examples.

Although embodiments of the present disclosure have been shown and illustrated, it shall be understood by those skilled in the art that the above embodiments are exemplary and cannot be construed to limit the present disclosure; various changes, modifications, alternatives, and variants can be made in the embodiments without departing from the scope of the present disclosure.

What is claimed is:

1. An animal feeding apparatus, comprising a base integrally formed with a handle protruding thereon and away from a reservoir for one-hand holding, and the reservoir coaxially connected to an end of the base and detachably coupled with the base via a threaded connection, the reservoir configured to accommodate medium and comprising a port away from the base, wherein, the medium is driven into or out of the reservoir through the port;

the base comprising a first cavity communicating with the reservoir, and a second cavity adjacent to and communicating with the first cavity, the animal feeding apparatus further comprising:

a piston moveably positioned in the first cavity, and having a first force end away from the reservoir and extending out of the first cavity, a pushrod being provided with a first toothed rack on an outer surface thereof;

an activator movable positioned in the second cavity, and having a second force end away from the reservoir and extending out of the second cavity, a link rod being provided with a second toothed rack on an outer surface thereof; and an linkage member integrally formed between the first cavity and the second cavity, the linkage member comprises a separator fixed inside the base and separates the first cavity from the second cavity, and a guiding gear rotatably positioned on the separator and rotatable around an axis perpendicular to moving directions of the piston and the activator, the first toothed rack and the second toothed rack both meshing with the guiding gear, and the linkage member configured to engage with the piston and the activator and guide the piston and the activator to move in two opposite directions; wherein, the first force end and second force end are configured to alternatively get pressed to drive the piston to get the medium to move out of the reservoir, or to drive the activator to get the medium to move into the reservoir from a medium supply source.

2. The animal feeding apparatus according to claim 1, wherein the separator comprises a through hole for receiving the guiding gear, with a shaft fixed in the through hole and movably connected with the guiding gear, the shaft extending parallel with the axis.

3. The animal feeding apparatus according to claim 1, wherein, the piston comprises a sealing member adjacent to the reservoir, and the pushrod connecting the first force end with the sealing member, the pushrod engaging with the guiding gear; the sealing member is sealingly connected to the base.

4. The animal feeding apparatus according to claim 3, wherein, the activator comprises the link rod extending from the second force end into the second cavity, with the link rod engaging with the guiding gear.

5. The animal feeding apparatus according to claim 1, wherein, the medium is either in liquid or powder form.

6. The animal feeding apparatus according to claim 1, further comprising a tube connecting to the port.

7. The animal feeding apparatus according to claim 1, wherein, the reservoir is at least partially transparent to show the medium inside the reservoir.

8. The animal feeding apparatus according to claim 1, wherein, the first cavity is co-axial with the reservoir, the second cavity is formed on a lateral side of the first cavity and extending parallel to the first cavity.

9. An animal feeding method using the animal feeding apparatus according to claim 1, comprising steps of:

holding animal feeding apparatus towards the medium supply source, and pressing the second force end to drive the activator to move towards the reservoir, further to guide the piston move away from the reservoir to get the medium in the medium supply source to move into the reservoir through the port; and relocating the animal feeding apparatus to an animal, and pressing the first force end to drive the piston to move towards the reservoir to get the medium to move out of the reservoir through the port to the animal.

* * * * *